3,327,032
METHOD FOR STEAM CURING OF ARTICLES COMPRISING FIBER, HYDRAULIC CEMENT, AND SILICA
Robert H. Adams, Somerville, N.J., assignor to Johns-Manville Corporation, New York, N.Y., a corporation of New York
Filed July 15, 1963, Ser. No. 294,948
6 Claims. (Cl. 264—82)

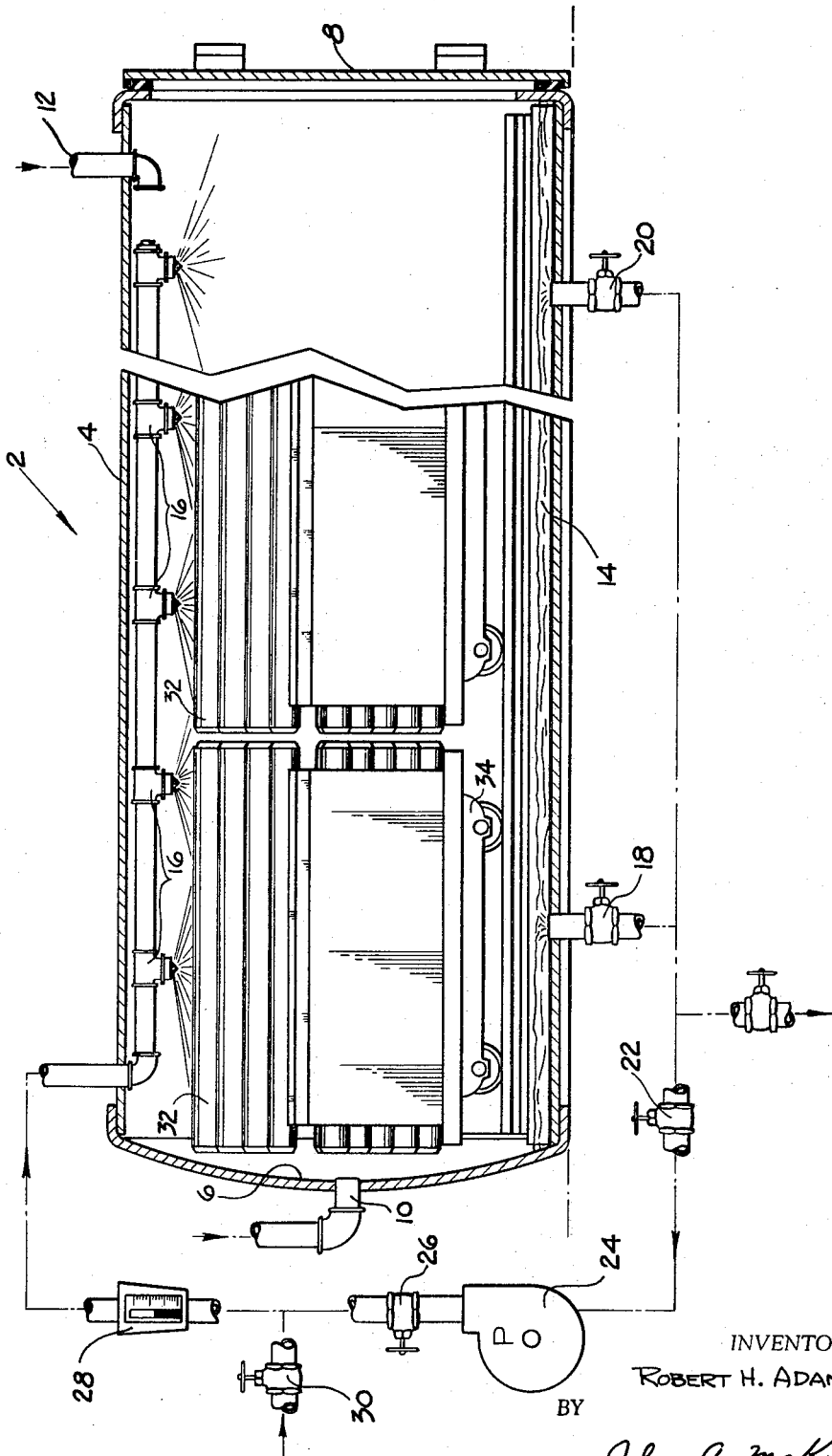

This invention relates to the curing of articles comprising fiber, a hydraulic cement and silica. More specifically, the invention discloses method and apparatus for the steam curing of articles comprising fiber, a hydraulic cement and silica. Although the invention is directed to the curing of all types of asbestos-cement articles, such as blocks, shingles and panels, it has been found to be particularly advantageous in the steam curing of asbestos-cement pipe.

For many years now, it has been desired practice in the asbestos-cement field, particularly the asbestos-cement pipe field in the United States, to steam cure asbestos-cement articles for a predetermined time under pressure in an autoclave. This type of curing requires a large number of autoclaves since the standard cycle for the loading, curing and unloading of the articles to be cured requires about twenty (20) hours. Also, this large number of autoclaves must be provided with trays and other types of equipment which are used to position and support the articles during the curing cycles.

It is a primary object of the instant invention to provide method and apparatus for the steam curing of articles comprising fiber, a hydraulic cement and silica to effect the curing of such articles to predetermined specifications in a period of time substantially less than the time previously required to effect the same cure.

The foregoing object is accomplished in accordance with the instant invention wherein a conventional autoclave is provided with means for providing, as desired, a spray of water in the autoclave. In one embodiment of the invention, the articles to be cured are loaded into the autoclave which is then closed and filled with steam until a predetermined level of steam pressure exists therein. At a predetermined time, water is sprayed from a plurality of spray nozzles onto the articles within the autoclave. The application of the water sprays while the proper level of steam pressure is maintained within the autoclave provides a unique combination for the proper curing of articles comprising fiber, hydraulic cement and silica. Experience has shown that when using such a method for curing of articles comprising fiber, a hydraulic cement and silica, that the time required for the proper curing of such articles at any level of steam pressure within the autoclave may be substantially reduced with no decrease in the physical characteristics of the resulting product.

The invention will be more fully understood and further objects and advantages thereof will become apparent when reference is made to the following detailed description of a preferred embodiment of the invention and the accompanying drawing which is a diagrammatic side view of a system for carrying out the concepts of the instant invention.

In the drawing, there is illustrated an autoclave 2 comprising a body 4 which is closed at one end with a cap 6 and at the other end with a door 8. If desired, both ends of the body 4 may be provided with doors to facilitate loading. The autoclave 2 is so constructed that any desired steam pressure can be built up and maintained within the autoclave. Steam is emitted into the autoclave through inlet pipes 10 and 12 connected to a suitable steam generator (not shown) until the desired steam pressure is built up in the autoclave. After that, sufficient steam is fed into the autoclave to maintain the desired pressure. Some of the steam after being released into the autoclave 2 condenses and forms a pool of water 14 in the bottom of the body 4.

In the preferred embodiment of the instant invention as illustrated in the drawing, a plurality of spray nozzles 16 are positioned adjacent the top of the body 4. However, it is to be understood that these nozzles may be located in any position as long as at least a portion of them are able to spray water into the autoclave in such a manner that at least the uppermost articles are contacted by water which then drains down and contacts the other articles in the autoclave. These spray nozzles 16 are fed with water by the system comprising a pair of outlet valves 18 and 20 arranged for draining water from the pool of water 14. The water is then fed through gate valve 22 to pump 24 which cooperates with a by-pass valve 26 and flow-meter 28 to supply the desired amount of water to the spray nozzles 16 for distribution into the body 4. In the event that the supply of water in the pool 14 is not sufficient to supply the required amount of water to the nozzles or for any other reason, it may be desirable to supply service water to the system through valve 30 from a suitable source of supply (not shown).

In operation, the articles to be cured comprising fiber, a hydraulic cement and silica, such as asbestos-cement pipe 32 in its uncured or semi-cured state, are loaded onto a platform or wheeled support 34 and moved into the body 4 which is at atmospheric pressure and temperature. The pipes 32 are positioned on the support 34 in a plurality of rows with a plurality of pipes in each row. As illustrated in the drawing, the body 4 is capable of receiving a pluarlity of such wheeled supports 34. After the body 4 has been loaded with the articles to be cured, the door 8 is closed and steam under pressure is emitted through inlets 10 and 12 into the body 4 until a predetermined pressure and temperature has been reached therein. In one instance, asbestos-cement pipe in thirteen (13) foot lengths and of the type designated 6 inch Class 150 were loaded into a body 4 having a length of approximately 170 ft. and a diameter of approximately 6 ft. Steam under pressure was admitted into the body 4 until the pressure therein was about 100 pounds per square inch and the temperature therein was about 340° F. Approximately 11,000 pounds of steam were required to bring the body 4 to this pressure and temperature and about 2000 pounds of this steam remained as steam in the body 4 and the other 9,000 pounds condensed into water. This 9,000 pounds comprised about 5,500 pounds on the pipe and about 3500 pounds in the pool 14 at the bottom of the body 4. Water was drained from the pool 14 through valves 18 and 20 and circulated through the system, illustrated in FIG. 1 and described above, to the spray nozzles 16. This water is at a temperature of about 340° F. The spray nozzles were positioned and calibrated so as to deliver approximately 1 gallon of water per minute for each foot of body length. This amount of water is given for illustration purposes only. The amount of water necessary to obtain the advantageous results of the instant invention is dependent upon the quantity and type of articles being cured. However, it is known that the water must be sprayed into the autoclave and the advantageous results may not be obtained by passing the steam through a water spray or by bubbling the steam into the autoclave through a pool of water. Sufficient steam was applied through the valves 10 and 12 during the curing of the pipe to insure that the pressure within the body 4 remained at about 100 pounds per square inch and the temperature therein at approximately 340° F. The pressure in all instances is gauge pressure and not absolute.

In the preferred embodiment of the instant invention, the water is sprayed through the nozzles 16 for a period of approximately 9 hours while the body 4 is maintained at a steam pressure of about 100 pounds per square inch and a temperature of about 340° F. This is substantially less than the 16 hours at steam pressure previously required to cure asbestos-cement pipe to meet standard specifications so that it is possible to increase the steam curing capacities of each autoclave approximately 50% for a normal work week. As explained above, the normal cycle conventionally used for curing asbestos-cement pipe in an autoclave requires twenty (20) hours comprising one hour to load the articles within the autoclave, one hour to bring the pressure within the autoclave to 100 pounds per square inch, sixteen (16) hours within the autoclave at the pressure of 100 pounds per square inch to cure the asbestos-cement pipe, one hour to blow the autoclave down to atmospheric pressure and one hour to unload. The normal work week, based on three shifts per day at eight hours per shift, five days a week, is 120 hours or six (6) normal cycles of twenty hours each. The cycle, as proposed in the instant invention, requires only twelve and one-half (12½) hours to complete and comprises one hour to load the articles within the autoclave, one hour to bring the pressure within the autoclave to 100 pounds per square inch, nine (9) hours within the autoclave at the pressure of 100 pounds per square inch to cure the asbestos-cement pipe, one-half (0.5) hour to blow the autoclave down to atmospheric pressure and one (1) hour to unload. The decrease in blowdown time is another advantage that is derived from the new system of steam curing. Previously, if a blowdown of this nature were attempted in the past, it would result in damage to the pipe. Thus, in the normal week of 120 hours, nine and six-tenths (9.6) new cycles of twelve and one-half (12½) hours each may be completed. This significant increase in the capacities of the autoclave is possible since in accordance with the procedures outlined in the instant invention, it is possible to obtain the same cure of the asbestos-cement pipe in nine (9) hours as compared to the cure previously obtained in sixteen (16) hours. It is to be particularly noted that this increase in capacity is obtained with no substantial increase in cost. The following table illustrates the advantageous results obtained from the inventive concepts of the instant application:

TABLE I

| Pipe Size | Steam Cure | | Average Ultimate Strength | |
|---|---|---|---|---|
| | Hrs. at Pressure* | Hrs. Spray | Crush, lbs. per ft. | Hydrostatic, lbs. per sq. in. |
| 6″—Cl. 150–13′ | 9 | 8 | 7,140 | 870 |
| | 16 | None | 7,070 | 820 |
| | 9 | do | 6,530 | 780 |
| 6″—Cl. 150–10′ | 9 | 10 | 7,010 | 740 |
| | 16 | None | 7,150 | 740 |
| | 9 | do | 6,660 | 680 |
| 6″—Cl. 100–10′ | 9 | 9 | 4,960 | 620 |
| | 16 | None | 5,050 | 610 |

*All steam cures made at 100 to 103 p.s.i. gage pressure.

In another series of tests, it was determined that the cure of asbestos-cement pipe could be reduced to a minimum of 6 hours using the concepts of the instant invention. The results of these tests appear in the following table:

TABLE II

| Pipe Cure | Steam Cure | | Average Ultimate Strength | |
|---|---|---|---|---|
| | Hrs. at Pressure* | Hrs. Spray | Crush, lbs. per ft. | Hydrostatic, lbs. per sq. in. |
| 6″ Special—Run #1 | 16 | 16 | 6,410 | 880 |
| | 16 | None | 5,860 | 830 |
| 6″ Special—Run #2 | 8 | 8 | 5,410 | 810 |
| | 16 | None | 5,310 | 790 |
| 6″ Special—Run #3 | 6 | 6 | 4,670 | 690 |
| | 16 | None | 4,620 | 680 |
| 6″ Special—Run #4 | 4 | 4 | 5,060 | 620 |
| | 16 | None | 5,740 | 780 |

*All steam cures at 100 p.s.i. gage pressure.

The pipe in each run varied from the pipe in another run in other characteristics such as wall thickness and formulation. However, the pipe in each run did not vary.

It is to be understood that the foregoing tables are for illustration purposes only. It is possible that times other than those specified in the tables may be utilized in the curing of articles comprising fiber, a hydraulic cement and silica. Also, the water sprays may be utilized for periods of times less than or more than the total time the article to be cured is subjected to the pressures within the autoclave. Furthermore, pressures other than those illustrated in the foregoing examples may be utilized to cure the articles within the autoclave. Thus, under normal conditions, an article that was cured at a steam pressure of about 100 pounds per square inch for 16 hours might be cured to the same extent by subjecting the same article to a steam pressure of about 125 pounds per square inch for 12 hours. By utilizing the water sprays in accordance with the instant invention, this period of 12 hours could be reduced substantially. In conventional practice, the steam pressure in the autoclave during the curing cycle is at least 80 pounds per square inch. However, in all instances, it is clearly evident that the time an article must be within an autoclave at a specific pressure and temperature may be greatly reduced by utilizing the inventive concepts of the instant application.

The term "fiber" as used herein includes asbestos of the type comprising chrysotile, crocidolite, amosite, tremolite, anthophyllite or mixtures thereof and other types of fiber which may be employed with steam cured hydraulic cement materials. The term "hydraulic cement" as used herein includes Portland cement, supersulphated slag cement, calcium aluminate cement, natural cement, pozzolanta cement, lime, mixtures thereof and other similar materials. The term "silica" includes silica flour, fly ash, calcined clay, fine sand, blast-furnace slag, mixtures thereof and other similar materials known to the art to be useful with alkaline hydraulic cements to form steam cured products. Although not specifically mentioned above, it is to be understood that fillers may also be included in the products to modify the workability, brittleness and other physical properties of the products.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Method for curing articles comprising fiber, hydraulic cement and silica comprising:
    (a) enclosing a plurality of articles comprising fiber, hydraulic cement and silica within a chamber,
    (b) introducing steam under pressure into said chamber, (c) maintaining said steam under pressure within said chamber, and
(d) distributing water over at least a portion of the surfaces of some of said articles within said chamber and draining at least portions of said water over at least a portion of the surfaces of the remaining articles within said chamber and into the lower portion of said chamber below said articles so that said articles are contacted at some time by at least a portion of said water during at least a portion of the time when said articles are enclosed in said chamber and maintained under said steam pressure.

2. Method for curing articles comprising fiber, hydraulic cement and silica comprising:
(a) enclosing a plurality of articles comprising fiber, hydraulic cement and silica within a chamber,
(b) introducing steam under pressure into said chamber,
(c) maintaining said steam under pressure within said chamber so that the temperature within said chamber is substantially the same as the temperature of said steam at said pressure within said chamber,
(d) collecting water comprising the condensation of portions of said steam in a pool below said articles in said chamber, and
(e) distributing portions of said collected water over at least a portion of the surfaces of some of said articles within said chamber and draining at least portions of said water over at least a portion of the surfaces of the remaining articles within said chamber and into said pool below said articles in said chamber so that said articles are contacted at some time by at least a portion of said water during at least portions of the time said chamber is maintained under said steam pressure.

3. Method for curing articles comprising fiber, hydraulic cement and silica comprising:
(a) enclosing a plurality of articles comprising fiber, hydraulic cement and silica within a chamber,
(b) introducing steam under pressure into said chamber,
(c) increasing the steam pressure within said chamber until a gauge pressure of at least eighty (80) pounds per square inch is obtained within said chamber, and
(d) distributing water over at least a portion of the surfaces of some of said articles within said chamber and draining at least portions of said water over at least a portion of the surfaces of the remaining articles within said chamber and into the lower portion of said chamber below said articles so that said articles are contacted at some time by at least a portion of said water during at least portions of the time said chamber is at said steam pressure.

4. Method for curing articles comprising fiber, hydraulic cement and silica comprising:
(a) enclosing a plurality of articles comprising fiber, hydraulic cement and silica within a chamber,
(b) introducing steam under pressure into said chamber,
(c) increasing the steam pressure within said chamber until a gauge pressure of at least eighty (80) pounds per square inch is obtained within said chamber,
(d) maintaining said steam pressure within said chamber at least for a period of time of about six (6) hours, and
(e) distributing water over at least a portion of the surfaces of some of said articles within said chamber and draining at least portions of said water over at least a portion of the surfaces of the remaining articles within said chamber during substantially the entire period of time said chamber is at said steam pressure.

5. Method for curing articles comprising fiber, hydraulic cement and silica comprising:
(a) enclosing a plurality of articles comprising fiber, hydraulic cement and silica within a chamber,
(b) introducing steam under pressure into said chamber,
(c) increasing the steam pressure within said chamber until a gauge pressure of at least eighty (80) pounds per square inch is obtained within said chamber,
(d) maintaining said steam pressure within said chamber at said gauge pressure level at least for a period of time of about six (6) hours, and
(e) distributing water over at least a portion of the surfaces of some of said articles within said chamber and draining at least major portions of said water over at least a portion of the surfaces of the remaining articles within said chamber and into the lower portion of said chamber below said articles so that said articles are contacted at some time by at least a portion of said water during at least a portion of the time when said chamber is under said steam pressure, said water being distributed at the rate of approximately one gallon per minute per foot of the length of said chamber occupied in a conventional loading by said articles.

6. Method for curing articles comprising fiber, hydraulic cement and silica comprising:
(a) enclosing a plurality of articles comprising fiber, hydraulic cement and silica within a chamber,
(b) introducing steam under pressure into said chamber,
(c) increasing the steam pressure within said chamber until a gauge pressure of at least eighty (80) pounds per square inch is obtained within said chamber,
(d) maintaining said steam pressure within said chamber at said gauge pressure level at least for a period of time of about six (6) hours,
(e) collecting water comprising the condensation of portions of said steam in a pool below said articles in said chamber,
(f) distributing portions of said collected water over at least a portion of the surfaces of some of said articles within said chamber and draining at least portions of said water over at least a portion of the surfaces of the remaining articles within said chamber and into said pool below said articles in said chamber during a major portion of the time said chamber is at said steam pressure.

References Cited
UNITED STATES PATENTS

| | | | |
|---|---|---|---|
| 732,674 | 6/1903 | Bell et al. | 264—82 |
| 745,476 | 12/1903 | Bell et al. | 106—78 |
| 747,193 | 12/1903 | Leet et al. | 264—82 |
| 1,374,403 | 4/1921 | Smith | 264—65 |
| 2,202,481 | 4/1940 | Cox et al. | 264—13 |
| 3,275,742 | 9/1966 | Klingel | 264—82 |

ALEXANDER H. BRODMERKEL, *Primary Examiner.*

J. H. WOO, *Assistant Examiner.*